(12) United States Patent
Cnossen et al.

(10) Patent No.: US 7,635,522 B2
(45) Date of Patent: Dec. 22, 2009

(54) FLUOROPOLYMER-CONTAINING SOL-GEL COATING

(75) Inventors: Gerard Cnossen, Drachten (NL); Marcel Rene Boehmer, Eindhoven (NL); Maria Suriaatmaja, Singapore (SG); Dipti Dilip Khasnis, Wilmington, DE (US); Walter André Jules Stoks, Rijmenam (BE); Ronald Earl Uschold, West Chester, PA (US); Luc. G.P.J D'Haenens, Ghent (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 478 days.

(21) Appl. No.: 10/546,943

(22) PCT Filed: Feb. 20, 2004

(86) PCT No.: PCT/IB2004/050136

§ 371 (c)(1),
(2), (4) Date: Aug. 25, 2005

(87) PCT Pub. No.: WO2004/076570

PCT Pub. Date: Sep. 10, 2004

(65) Prior Publication Data

US 2006/0251837 A1    Nov. 9, 2006

(30) Foreign Application Priority Data

Feb. 28, 2003    (WO) .................... PCT/SG03/00051

(51) Int. Cl.
*B32B 9/04*    (2006.01)

(52) U.S. Cl. .................. 428/447; 428/421; 428/422; 428/450; 524/266; 524/268; 525/104; 106/287.13

(58) Field of Classification Search .................. None
See application file for complete search history.

(56) References Cited

U.S. PATENT DOCUMENTS

| 6,183,872 | B1 * | 2/2001 | Tanaka et al. ............... 428/429 |
| 6,262,171 | B1 * | 7/2001 | Mayer et al. ................ 524/838 |
| 6,288,160 | B1 * | 9/2001 | Wada et al. ................. 524/506 |
| 6,337,129 | B1 * | 1/2002 | Watanabe et al. ........... 428/328 |
| 6,579,620 | B2 * | 6/2003 | Mizuno et al. .............. 428/447 |
| 2004/0171726 | A1 * | 9/2004 | D'Haenens et al. ......... 524/261 |

FOREIGN PATENT DOCUMENTS

EP    0909800    4/1999

OTHER PUBLICATIONS

"Silicon-Containing Polymers- The Science and Technology of Their Synthesis and Applications" edited by Jones et al. and published in 2000 by Kluwer Academic Publishers, p. 44-46.*
"Ceramic Films and Coatings" edited by Wachtman et al. and published in 1993 by Noyes Publications, p. 225-227.*

* cited by examiner

*Primary Examiner*—Marc S Zimmer

(57) ABSTRACT

A sol-gel coating composition comprising fluoropolymer particles is disclosed. The fluoropolymer particles are distributed homogeneously in the coating, leading to scratch-resistant anti-stick and low-friction coatings that are suitable, for example, for electrical and non-electrical domestic appliances.

18 Claims, 2 Drawing Sheets

FLUOROPOLYMER-CONTAINING SOL-GEL COATING

The present invention relates to a sol-gel coating which is based on a sol-gel precursor and which comprises substantially homogeneously distributed fluoropolymer particles.

Fluoropolymer coatings that provide anti-stick and low-friction properties in medium to high temperature applications such as steam irons or frying pans usually contain a certain amount of heat resistant polymers, such as polyamide imide, which acts as a binder. The mechanical properties of these coatings, such as scratch and wear resistance, are inferior to those that contain sol-gel binder materials Although the wear and scratch resistance of coatings is improved by the use of sol-gel binders, the anti-stick properties of fluoropolymer in sol-gel formulations do not meet the expectations. A convenient measure for the anti-stick property is the contact angle with water. The contact angle will depend on the volume fraction of the fluoropolymer particles and their particle distribution in the coating. If the particles are flocculated, there is little chance of finding them at the interface. Consequently the binder will largely determine the contact angle. Known sol-gel formulations that are mixed with fluoropolymer tend to comprise a considerable degree of flocculation of the fluoropolymer particles. Consequently, contact angles with a maximum of about 85° can only be achieved. Increasing the volume fraction of fluoropolymer particles in order to obtain higher contact angles will have a negative effect on the wear resistance, which is provided by the binder.

The present invention aims to provide a sol-gel coating according to the preamble, which coating provides relatively high anti-stick properties.

To this end, the present invention provides a sol-gel coating, based on a coating composition comprising at least one sot-gel precursor and fluoropolymer particles, which coating has hydrophobic properties such that the contact angle of water at the surface thereof is at least 88°, preferably at least 90°, and more preferably at least 94°. Such a high contact angle results in a high anti-stick property of the coating. Said anti-stick property is considerably higher that that of the known coatings of sol-gel binder and fluoropolymer particles in which flocculation of the latter occurs.

In a preferred embodiment, the sol-gel coating composition comprises at least one sol-gel precursor and a stabilized aqueous dispersion of fluoropolymer particles. In a particular embodiment of the invention, the fluoropolymer particles are stabilized with polysiloxane polyoxyalkylene copolymer.

The polysiloxane portion of the stabilizer provides the hydrophobic portion of the stabilizer that is attracted to the dispersed fluoropolymer particles, and the oxyalkylene portion of the stabilizer provides the hydrophilic portion of the stabilizer enabling the stabilizer to be dispersed in the aqueous medium, the presence of these two portions enabling the stabilizer to function as such in the dispersion. The polysiloxane polyoxyalkylene copolymers used in the present invention are nonionic, i.e. free of electrical charge, with the stabilization effect being achieved by the presence of the hydrophobic and hydrophilic portions of the stabilizer.

Preferably, the sol-gel coating according to the present invention also comprises filler particles, in particular silica particles. Such particles may originate from aqueous silica sol.

Sol-gel materials undergo significant shrinkage upon curing, and therefore they are advantageously filled with other particles, often silica particles, in order to achieve a sufficient layer thickness for the application.

In a particular embodiment, the volume fraction of fluoropolymer particles in the sol-gel coating is lower than 50%. For volume fractions of particles higher than 50%, insufficient binder will be present resulting in a porous coating. Therefore, very poor wear resistance is to be expected at volume fractions of particles higher than 50%.

Preferably, the volume fraction of fluoropolymer particles in the sol-gel coating is in the range of 15-30%.

In a preferred embodiment of the invention, the fluoropolymer particles in the coating comprise polytetrafluoroethylene (PTFE) particles having a melt viscosity of at least $1\times10^8$ Pa·s at 380° C., which has the highest heat stability among the fluoropolymers. Such PTFE may also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(ethyl or propyl vinyl ether) (PEVE or PPVE) being preferred. The amount of such a modifier will be insufficient to confer melt fabricability to the PTFE, generally being no more than 0.5 mole %. The PTFE may also be of the micropowder type, wherein a chain transfer agent is present in the aqueous polymerization medium to produce low molecular weight PTFE, characterized by a melt viscosity of $0.1\text{-}100\times10^{3}$ Pa·s at 372° C. Such PTFE is melt-flowable, but not melt-fabricable, i.e. when fabricated from the melt, the fabricated article of such PTFE lacks integrity and fractures either spontaneously or upon being subjected to slight stress.

While PTFE is a preferred fluoropolymer, the fluoropolymer component may also be melt-fabricable fluoropolymer. Examples of such melt-fabricable fluoropolymers include copolymers of tetrafluoroethylene (TFE) and at least one fluorinated copolymerizable monomer (comonomer) present in the polymer in a sufficient amount to reduce the melting point of the copolymer to substantially below that of PTFE homopolymer, e.g. to a melting temperature no higher than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE), and perfluoro (methyl vinyl ether) (PMVE). Preferred TFE copolymers include FEP (TFE/HFP copolymer), PFA (TFE/PAVE copolymer), TFE/HEP/PAVE wherein PAVE is PEVE and/or PPVE, and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity, i.e. being melt-fabricable. Typically, the melt viscosity will be at least $1\times10^2$ Pa·s and may range up to about $60\text{-}100\times10^3$ Pa·s as determined at 372° C. according to ASTM D-1238.

The fluoropolymer particles containing sol-gel formulations are preferably made from hybrid sol-gel precursors, comprising an organosilane compound. Preferred sol-gel precursors comprise methyltri(m)ethoxysilane, phenyltri(m) ethoxysilane, diphenyldi(m)ethoxysilane, glycidoxypropyl-tri(m)ethoxysilane, or combinations thereof. A small amount of a non-hybrid sol-gel precursor material such as tetra(m) ethoxysilane may be added.

In particular, the sol-gel coating according to the present invention is temperature-resistant up to 400° C.

According to the present invention, sol-gel formulations mixed with aqueous dispersions of fluoropolymer particles are obtained, without the occurrence of flocculation of the fluoropolymer particles. Coatings made with these formulations have an improved hydrophobicity due to the better distribution of fluoropolymer particles. Preferably, at least 80% of the fluoropolymer particles are present as substantially free, non-aggregated particles within the coating.

The sol-gel coating according to the present invention is advantageously deposited on a substrate. The substrate may be of any material which can withstand high baking temperature, such as metal and ceramics, examples of which include aluminum, or an aluminum alloy, cold-rolled steel, stainless steel, enamel, glass, and pyroceramic materials The aluminum sole plate of a (steam) iron may be mentioned as an example. These sole plates are anodized and coated with a sol-gel base coat before the sol-gel coating according to the present invention is applied.

Preferably, the sol-gel coating according to the present invention is applied in domestic appliances to form coated articles, such as steam irons, toasters, sandwich makers, kettles and coffee makers, vacuum cleaners, fans and domestic air treatment devices, mixers and food processors, ice cream makers, deep fat flyers, grills and electric gourmet sets and woks.

The sol-gel coatings find further applications in articles such as cookware, frying pans and other cooking pots and utensils, bakeware, oven liners, rice cookers, and inserts therefor. In addition, sol-gel coatings of this invention have many industrial uses for articles such as cutting blades, valves, wire, shoe molds, snow shovels and plows, ship bottoms, chutes, conveyors, roller surfaces, dies, tools, industrial containers, molds, lined reactor vessels, automotive panels, heat exchangers, tubing, and the like.

The present invention also relates to a method of obtaining a sol-gel coating in which fluoropolymer particles are not flocculated but are mostly present as single individual particles.

To this end, the present invention provides a method of preparing a sol-gel coating comprising fluoropolymer particles, said method comprising the steps of:
  acidifying a silica sol to a pH value of about 3;
  adding part of the total amount of sol-gel precursor sufficient to stabilize the silica particles;
  hydrolyzing and stabilizing the mixture;
  adding the rest of the total amount of sol-gel precursor;
  hydrolyzing the mixture; and
  adding fluoropolymer dispersion.

By applying the method according to the present invention it is possible to formulate a coating liquid in which the fluoropolymer particles are not flocculated and are present as single, individual particles. In this case the fluoropolymer particles will be homogeneously distributed in the coating and will have a much more significant contribution to the hydrophobicity of the coating. With this approach, water contact angles of 94° or more can be achieved with only 20 volume % of fluoropolymer particles in a coating with a sol-gel matrix.

As mentioned above, these fluoropolymer particles containing sol-gel formulations can be made from sol-gel precursors such as methyltri(m)ethoxysilane (MTMS, MTES), which is often used in scratch-resistant and temperature-resistant coatings, for example on the sole plates of laundry irons. These precursors must be hydrolyzed before application. Water is needed for the hydrolysis reaction, and an acid is normally used as a catalyst. Sol-gel precursors are not soluble in water, so alcohols are often added to obtain a single-phase system right from the start of the hydrolysis reaction in common practice.

These requirements for the preparation of sol-gel coating liquids which include low pH, the presence of alcohol and water, and the addition of other particles, imposes constraints on the formulation of sol-gel coating liquids. When fluoropolymer dispersions are added, flocculation easily occurs giving a coating liquid with aggregates of fluoropolymer particles, and consequently the fluoropolymer particles are not distributed uniformly in the coating.

To improve the colloidal stability of the coating formulation, the fluoropolymer dispersion may be modified to give an improved compatibility with the sol-gel coating liquid, or the sol-gel lacquer formulation may be adjusted to arrive at a better compatibility with the fluorocarbon dispersion. In practice a combination of these two approaches will prove most useful.

Stabilizing fluorocarbon particles in aqueous dispersions is difficult owing to the hydrophobicity of the fluoropolymer particles. Specific surface-active agents, which have to be used within a narrow concentration window, have been developed to achieve well-stabilized aqueous dispersions. Advantageously, the fluoropolymer particles are stabilized with a polysiloxane polyoxyalkylene copolymer. The addition of alcohols to these dispersions may easily lead to changes in the layer of adsorbed surfactants with respect to the adsorbed amount and orientation of the surfactant molecules, which may result in the loss of colloidal stability.

Therefore, as a first aim in the modification of the sol-gel recipe, the amount of alcohol used needs to be minimized. Alcohol is formed in the hydrolysis and alcohol condensation reactions of the sol-gel precursors. This is inevitable in sol-gel processing.

However, the addition of alcohol to ensure a single phase from the beginning of the hydrolysis reaction is not necessary if the precursors are thoroughly mixed with water.

During hydrolysis, sufficient alcohol will be formed to dissolve the unreacted sol-gel precursors, which is visually easily followed by the formation of a single non-scattering phase. Reduction of surface tension and improvement of the drying behavior of the coatings by the addition of alcohols is not necessary because the fluorocarbon dispersion will contain a sufficient amount of surfactants to lower the surface tension and to suppress the formation of inhomogeneities effectively in the coating during the drying phase.

As the maximum layer thickness of sol-gel layers without particles is usually limited, particles are frequently added to reduce the shrinkage in the drying and curing phase, which results in an increase in the maximum crack-free layer thickness.

Aqueous silica sols are often used for this purpose. To maintain a high solid content in the final formulation, it is advantageous to use the water from the aqueous sol to hydrolyze the sol-gel precursor. Flocculation of the silica sol can be avoided during the hydrolysis of the sol-gel precursors by the adjustment of its pH value to around 3, preferably by dissolving a solid acid such as maleic acid, followed by the addition of a very small amount of a sol-gel precursor, for instance methyltrimethoxysilane. Practically, the amount of sol-gel precursor will be about 0.01-1% of the total amount of sol-gel precursor that is ultimately added. This small amount is hydrolyzed in the sol and will adsorb onto the surface of the silica particles.

Such a treatment makes the colloidal stability of the silica less dependent on the amount of alcohol produced in the hydrolysis of the bulk of the silanes, which can cause flocculation. It has been documented frequently that, upon addition of sol-gel precursors, silica sols first show an increase in turbidity, indicating flocculation, later followed by a decrease in turbidity, indicating restabilization. This is not desirable as the restabilization may not be complete and additional filtering steps may be required. The stepwise addition of the sol-gel precursor can prevent this.

The above method differs from the one described in Handbook of Advanced Electronic and Photonic Materials 5, pp. 219-262, 2000, Academic Press, where the sol-gel precursor is prehydrolyzed and leads to a more dilute formulation. The prehydrolysis step also leads to the formation of partially condensed products, which have a much lower affinity for the silica surface, and may lead to insufficient stabilization of the silica particles to withstand the second addition of MTMS without the occurrence of flocculation.

After the hydrolysis of the second addition of the sol-gel precursor has been completed, the fluoropolymer dispersion can be added and no flocculation will occur. The resulting formulation can then be applied by spray coating. After curing, a coating of 10 μm thickness can be obtained in which the fluoropolymer particles are homogeneously distributed, leading to a high contact angle with water.

The present invention is further illustrated with reference to the drawing, in which:

FIG. 1 schematically represents the definition of contact angle;

Parts of the drawings are schematic and not drawn to scale. For the sake of clarity, similar constituents are referred to with the same reference numeral.

Figure 1:
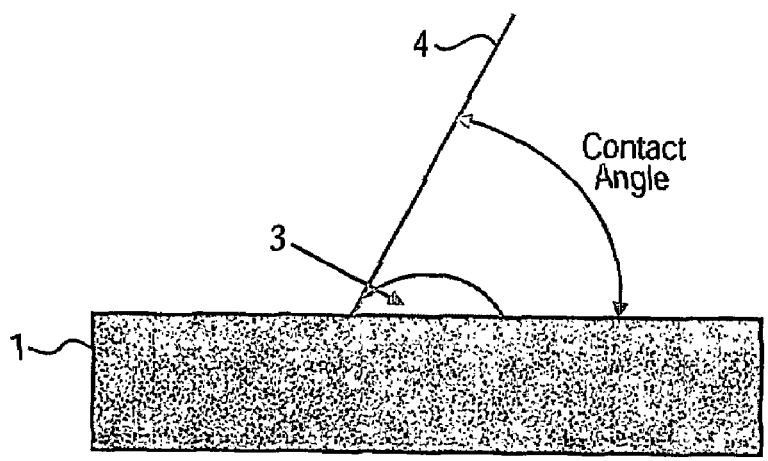

FIG. 1 schematically represents the definition of contact angle. Reference numeral 1 indicates a coating surface. A water droplet on said coating surface 1 is indicated by reference numeral 3. Line 4 is tangent to the outer surface of the droplet 3 at the intersection with the surface 1. The contact angle is defined as the angle between line 4 and the surface 1. The contact angle was measured using a Surface Contact Angle Goniometer manufactured by Rame-Hart Inc, USA. The following examples illustrate the fluoropolymer-containing sol-gel coating according to the present invention and the method of preparation thereof, compared with sol-gel coatings and methods of preparation thereof according to the prior art.

EXAMPLE 1

In a reaction vessel 5.5 g of maleic acid was dissolved in 380 g of Ludox AS40. The measured pH value of the acidified silica sol was between 2.5 and 2.9. 0.95 g of MTMS was then added and the mixture was stirred for 45 minutes. Subsequently 391 g of MTMS was stirred into the acidified and surface-modified silica sol. 60 minutes later the mixture was diluted with 196 g of water before the gradual addition of 315 g of a 30% polytetrafluoroethylene (PTFE) dispersion in water stabilized with a polysiloxane polyoxyalkylene copolymer (SILWET L77®) together with a suitable defoaming agent. After the addition of the PTFE had been completed, 30 g of a mica-based pigment was added.

Coatings were sprayed on previously dried sol-gel layers applied on anodized aluminum plates and cured at 300° C. The amount of PTFE particles in the cured coating was approximately 18% by volume. The water contact angle of the cured coating was determined at 94±2°.

Figure 2:
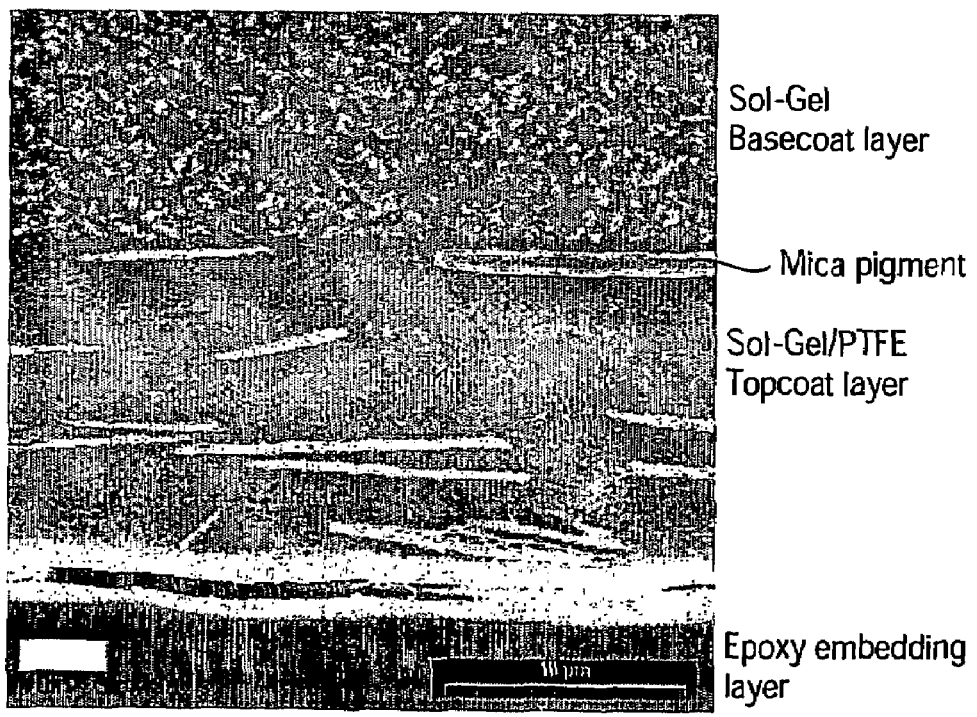
FIG. 2 is a Scanning Electron Microscopy image showing a cross-section of a sol-gel basecoat layer provided with a sol-gel/PTFE topcoat layer prepared according to Example 1.

The PTFE particles were homogeneously distributed through the coating and no sign of flocculation could be observed from the cross-sectional images obtained by Scanning Electron Microscopy. As an example, a typical cross-sectional picture is given in FIG. 2.

The sprayed coating properties, in terms of gloss, scratch resistance, and water contact angle were the same for coatings sprayed immediately after preparation and for coatings sprayed 8 hours after completion of the coating liquid formulation. The viscosity of the coating lacquer remained constant over this period of time.

EXAMPLE 2

This example is comparable to example 1, except that the ratio of silica particles to polytetrafluorethylene (PTFE) particles was adjusted to increase the volume fraction of PTFE in the final coating.

In a reaction vessel 2.2 g of maleic acid was dissolved into 124 g of Ludox AS40 and 110 g of water. The measured pH value of the acidified silica sol was between 2.5 and 2.9. 0.31 g of MTMS was then added and the mixture was stirred for 45 minutes. Subsequently 308 g of MTMS was stirred into the acidified and surface-modified silica sol. 60 minutes later the mixture was diluted with 154 g of water, followed by the gradual addition of 460 g of a 30 % PTFE dispersion in water stabilized with a polysiloxane polyoxyalllylene copolymer (SILWET L77®) together with a suitable defoaming agent. After the addition of the PTFE had been completed, 35 g of a mica-based pigment were added.

Coatings were sprayed on previously dried sol-gel layers applied on anodized aluminum plates and cured at 300° C. The amount of PTFE particles in the cured coating was approximately 30% by volume. The water contact angle of the cured coating was determined at 98±2°.

EXAMPLE 3

This example is comparable to example 1, except that the ratio of silica particles to polytetrafluorethylene (PTFE) particles was adjusted to reduce the volume fraction of PTFE in the final coating.

In a reaction vessel 7.5 g of maleic acid was dissolved into 425 g of Ludox AS40. The measured pH value of the acidified silica sol was between 2.5 and 2.9. 1.1 g of MTMS was then added and the mixture was stirred for 45 minutes. Subsequently 385 g of MTMS was stirred into the acidified and surface-modified silica sol. 60 minutes later the mixture was diluted with 193 g of water before the gradual addition of 194 g of a 30% PTFE dispersion in water stabilized with a polysiloxane polyoxyalkylene copolymer (SILWET L77®) together with a suitable defoaming agent. After the addition of the PTFE had been completed, 37 g of a mica-based pigment were added. Coatings were sprayed on previously dried sol-gel layers applied on anodized aluminum plates and cured at 300° C. The amount of PTFE particles in the cured coating was approximately 10% by volume. The water contact angle of the cured coating was determined at 89±3°.

COMPARATIVE EXAMPLE 1

In this example use is made of a polytetrafluoroethylene (PTFE) dispersion stabilized with an alkyl phenol ethoxylate surfactant.

348 g of MTMS was mixed with 18 g of mica-based pigment, 5 g of maleic acid, and 174 g of ethanol. The hydrolysis was started by addition of 345 g Ludox AS40. After one hour of continuous stirring a suitable defoamer was added, followed by the addition of 107 g of a commercially available PTFE dispersion consisting of 62 weight % PTFE particles stabilized by an alkyl phenol ethoxylate surfactant and 3.5 g of a perfluoroalkylsulfonamido oxyethylene surfactant. The PTFE primary particle size was around 250 nm. After mixing for at least 15 minutes, this coating liquid was sprayed on previously dried sol-gel layers applied on an anodized aluminum ironing plate of a steam iron and was cured at 300° C.

Figure 3:
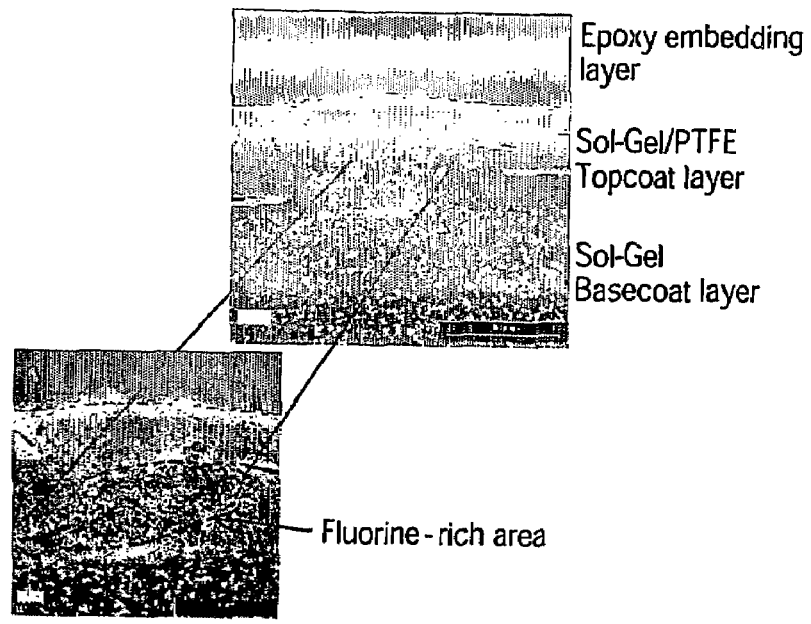
FIG. 3 is a Scanning Electron Microscopy image showing a cross-section of a sol-gel basecoat layer provided with a sol-gel/PTFE topcoat layer prepared according to Comparative Example 1.

A Scanning Electron Microscope picture of the cross-section of the coating is given in FIG. 3. The picture shows inhomogeneities in the coating, caused by flocculation of the PTFE particles. Energy Dispersive Analysis of X-rays reveals that the inhomogeneity is rich in fluorine, indicative of flocculated PTFE particles.

The flocculation of the PTFE particles reduces the PTFE amount at the surface and results in water contact angles of only 84±2°.

COMPARATIVE EXAMPLE 2

To a mixture of 100 g MTMS, 50 g ethanol and 1.4 g maleic acid, 100 g of Ludox AS40 was slowly added. 60 minutes later, 75 g of a 30% polytetrafluorethylene (PTFE) suspension in water stabilized with a polysiloxane polyoxyalkylene copolymer was slowly added, followed by the addition of 30 g of a mica based pigment.

Coatings were sprayed on previously dried sol-gel layers applied on anodized aluminum plates and cured at 300° C. The gloss of the first coating sprayed was much higher than that of a coating sprayed 2 hours after completion of preparation of the coating liquid. The viscosity had increased to unacceptably high values after no more than 2 hours. The amount of PTFE particles in the cured coating was approximately 18% by volume, however, the water contact angle of the cured coating was determined at only 82±3°.

Figure 4:
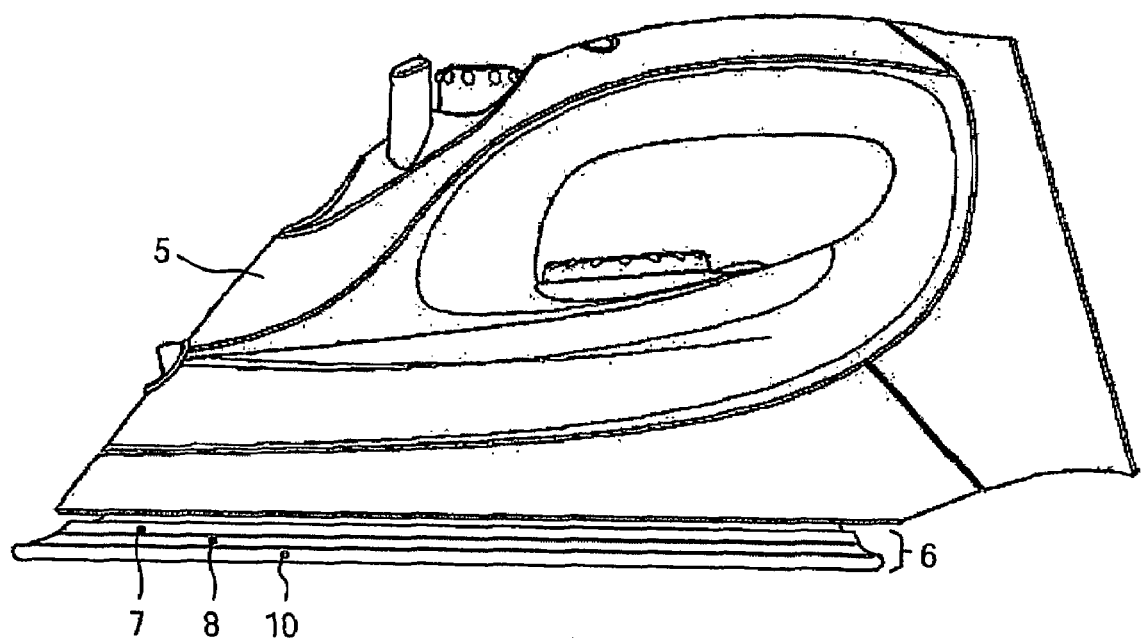
FIG. 4 schematically shows an iron, the sole plate of which is provided with a sol-gel coating comprising homogeneously distributed fluoropolymer particles.

FIG. 4 is a schematic side view of an iron according to the present invention. Said iron comprises a housing 5, which may be made of a synthetic resin material. The bottom side of the housing is provided with a metal sole plate 6. In the present embodiment, the sole plate is made of a block 7 of diecast aluminum to which a thin plate 8 of aluminum is secured. This thin plate 8 is also referred to as the ironing plate. As mentioned earlier, the aluminum plate may comprise aluminum as well as an aluminum alloy. A sol-gel coating 10 comprising homogeneously distributed fluoropolymer particles, according to the present invention, is applied on top of the thin plate 8. Said sol-gel coating provides a very good wear and scratch resistance, as well as high anti-stick properties, which is very advantageous for the gliding properties of the sole plate.

The invention claimed is:

1. A coated article comprising a substrate coated with a sol-gel coating, the sol-gel coating, based on a sol-gel precursor comprising fluoropolymer particles, said coating having hydrophobic properties such that the contact angle of water at the surface thereof is at least 88°, wherein the coated article comprises a domestic appliance, and wherein the fluoropolymer particles of the sol-gel coating are stabilized with a polysiloxane polyoxyalkylene copolymer.

2. The coated article according to claim 1, wherein a contact angle of water at the surface of the sol-gel coating is at least 90°.

3. The coated article according to claim 1, wherein a contact angle of water at the surface of the sol-gel coating is at least 94°.

4. The coated article according to claim 1, wherein the sol-gel coating comprises filler particles.

5. The coated article according to claim 4, the filler particles comprise silica particles originating from an aqueous silica sol.

6. The coated article according to claim 1, wherein the volume fraction of fluoropolymer particles of the sol-gel coating is below 50%.

7. The coated article according to claim 6, characterized in that the volume fraction of fluoropolymer particles is in the range of 15-30%.

8. The coated article according to claim 1, wherein the fluorocarbon particles of the sol-gel coating comprise polytetrafluoroethylene particles.

9. The coated article according to claim 1, wherein the sol-gel coating is based on a hybrid sol-gel precursor, comprising an organosilane compound.

10. The coated article according to claim 1, wherein the sol-gel precursors comprise, methyltri(m)ethoxysilane, phenyltri(m)ethoxysilane, diphenyldi(m)ethoxysilane, glycidoxypropyl-tri(m)ethoxysilane, or combinations thereof.

11. The coated article according to claim 1, wherein the sol-gel coating is temperature-resistant up to 400° C.

12. The coated article according to claim 1, wherein the substrate is a metal substrate.

13. The coated article according to claim 12 wherein the metal substrate is an aluminum or an aluminum alloy.

14. A coated article according to claim 1, characterized in that it belongs to a group comprising steam irons, vacuum cleaners, fans and domestic air treatment devices, kettles and coffee makers, mixers and food processors, toasters and sandwich makers, ice cream makers, deep fat fryers, grills and electric gourmet sets and woks, rice cookers, pots and pans, and cooking utensils.

15. Method of preparing a sol-gel coating, comprising the steps of: acidifying a silica sol to a pH value of about 3; adding part of a total amount of sol-gel precursor sufficient to stabilize the silica particles; hydrolyzing and stabilizing of the mixture; adding the rest of the total amount of sol-gel precursor; hydrolyzing the mixture; and adding fluoropolymer dispersion.

16. Method according to claim 15, characterized in that the fluoropolymer particles are stabilized with a polysiloxane polyoxyalkylene copolymer.

17. A coated article comprising a substrate coated with a sol-gel coating, the sol-gel coating composition comprising a sol-gel precursor and a stabilized aqueous dispersion of fluoropolymer particles, wherein the stabilizer is a polysiloxane polyoxyalkylene copolymer, characterized in that the coated article comprises a domestic appliance.

18. A coated article comprising a substrate coated with a sol-gel coating, the a sol-gel coating based on a coating composition comprising a sol-gel precursor and a stabilized aqueous dispersion of fluoropolymer particles, wherein the stabilizer is a polysiloxane polyoxyalkylene copolymer, characterized in that the coated article comprises a domestic appliance.

* * * * *